(12) United States Patent
Reinholdt (10) Patent No.: US 10,865,927 B2
(45) Date of Patent: Dec. 15, 2020

(54) LOW ENGAGEMENT FORCE FLUID COUPLING

(71) Applicant: Eaton Intelligent Power Limited, Dublin (IE)

(72) Inventor: James W. Reinholdt, San Clemente, CA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/278,867

(22) Filed: Feb. 19, 2019

(65) Prior Publication Data

US 2019/0264853 A1 Aug. 29, 2019

Related U.S. Application Data

(60) Provisional application No. 62/635,120, filed on Feb. 26, 2018.

(51) Int. Cl.
*F16L 37/34* (2006.01)
*B64D 39/04* (2006.01)
*F16L 37/52* (2006.01)

(52) U.S. Cl.
CPC ............ *F16L 37/34* (2013.01); *B64D 39/04* (2013.01); *F16L 37/52* (2013.01)

(58) Field of Classification Search
CPC ......... B24D 39/06; B24D 39/04; F16L 37/34; F16L 37/52
See application file for complete search history.

(56) References Cited

U.S. PATENT DOCUMENTS

| 3,498,324 A | | 3/1970 | Breuning | |
|---|---|---|---|---|
| 3,586,033 A | * | 6/1971 | Hieber | B64D 39/06 137/220 |
| 3,874,410 A | * | 4/1975 | Clark | G05D 16/10 137/614 |
| 3,976,100 A | | 8/1976 | Souslin | |

(Continued)

FOREIGN PATENT DOCUMENTS

| GB | 861729 A | 2/1961 |
|---|---|---|
| RU | 1778983 C | 7/1995 |

(Continued)

OTHER PUBLICATIONS

Database WPI, Week 199613, Thomas Scientific, London, GB; AN 1996-127275 XP00276623.

(Continued)

*Primary Examiner* — Kevin R Barss
(74) *Attorney, Agent, or Firm* — Fishman Stewart PLLC (57) ABSTRACT

A fluid coupling includes an inlet housing member, an outlet housing member rotatably connected with the inlet housing member to define a chamber, a regulator assembly disposed in the chamber and connected to the outlet housing member, a main poppet configured to control fluid flow between the inlet housing member and the outlet housing member, and/or a pilot poppet configured to selectively permit fluid flow through the main poppet. The outlet housing member may be configured to mate with and at least partially receive a nozzle. The regulator assembly may include a regulator housing and a regulator.

19 Claims, 13 Drawing Sheets

(56) References Cited

U.S. PATENT DOCUMENTS

| | | | | |
|---|---|---|---|---|
| 4,438,793 A * | 3/1984 | Brown | ................... | B64D 39/06 |
| | | | | 141/346 |
| 5,645,055 A * | 7/1997 | Danon | ..................... | A62B 7/14 |
| | | | | 128/204.25 |
| 2003/0137378 A1* | 7/2003 | Parker | .................. | F02M 57/025 |
| | | | | 335/220 |
| 2008/0295508 A1* | 12/2008 | Ma | ........................ | E02F 9/2207 |
| | | | | 60/459 |

FOREIGN PATENT DOCUMENTS

| | | | | |
|---|---|---|---|---|
| WO | 2014170635 A1 | 10/2014 | | |
| WO | WO-2015026436 A2 * | 2/2015 | ............ | B64D 39/06 |
| WO | 2017066607 A1 | 4/2017 | | |

OTHER PUBLICATIONS

International Search Report, PCT/US2016/057094, dated Feb. 9, 2017.

\* cited by examiner

LOW ENGAGEMENT FORCE FLUID COUPLING

CROSS-REFERENCE TO RELATED APPLICATION

This application claims the benefit of U.S. Provisional Patent Application Ser. No. 62/635,120, filed on Feb. 26, 2018, the disclosure of which is hereby incorporated by reference in its entirety as though fully set forth herein.

TECHNICAL FIELD

The present disclosure generally relates to fluid couplings, including low engagement force fluid couplings that may be used in connection with aircraft and/or aerial refueling.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Aerial refueling systems often rely on refueling couplings that couple a tanker aircraft (e.g., the aircraft supplying the fuel) with a receiving aircraft. Typically, such couplings have a high engagement load, which may involve the receiving aircraft to approach the tanker aircraft at relatively high speeds or involve a high drag drogue which increases tension forces on an aerial refueling hose deployed by the tanker aircraft. Requiring the receiving aircraft to approach at relatively high speeds may dictate increased caution. Additionally, the use of a high drag drogue, which is disposed at a refueling end of the hose, may make the hose prone to breaking during disengagement of the coupling from the receiving aircraft, which may present safety challenges.

An example of a fluid coupling is generally described in International Patent Application PCT/US2016/057094, the disclosure of which is hereby incorporated by reference in its entirety as though fully set forth herein.

There is a desire for solutions/options that minimize or eliminate one or more challenges or shortcomings of fluid couplings. The foregoing discussion is intended only to illustrate examples of the present field and should not be taken as a disavowal of scope.

SUMMARY

In embodiments, a fluid coupling may comprise an inlet housing member, an outlet housing member rotatably connected with the inlet housing member to define a chamber, a regulator assembly disposed in the chamber and connected to the outlet housing member, a main poppet configured to control fluid flow between the inlet housing member and the outlet housing member, and/or a pilot poppet configured to selectively permit fluid flow through the main poppet. The outlet housing member may be configured to mate with and at least partially receive a nozzle. The regulator assembly may include a regulator housing and/or a regulator.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
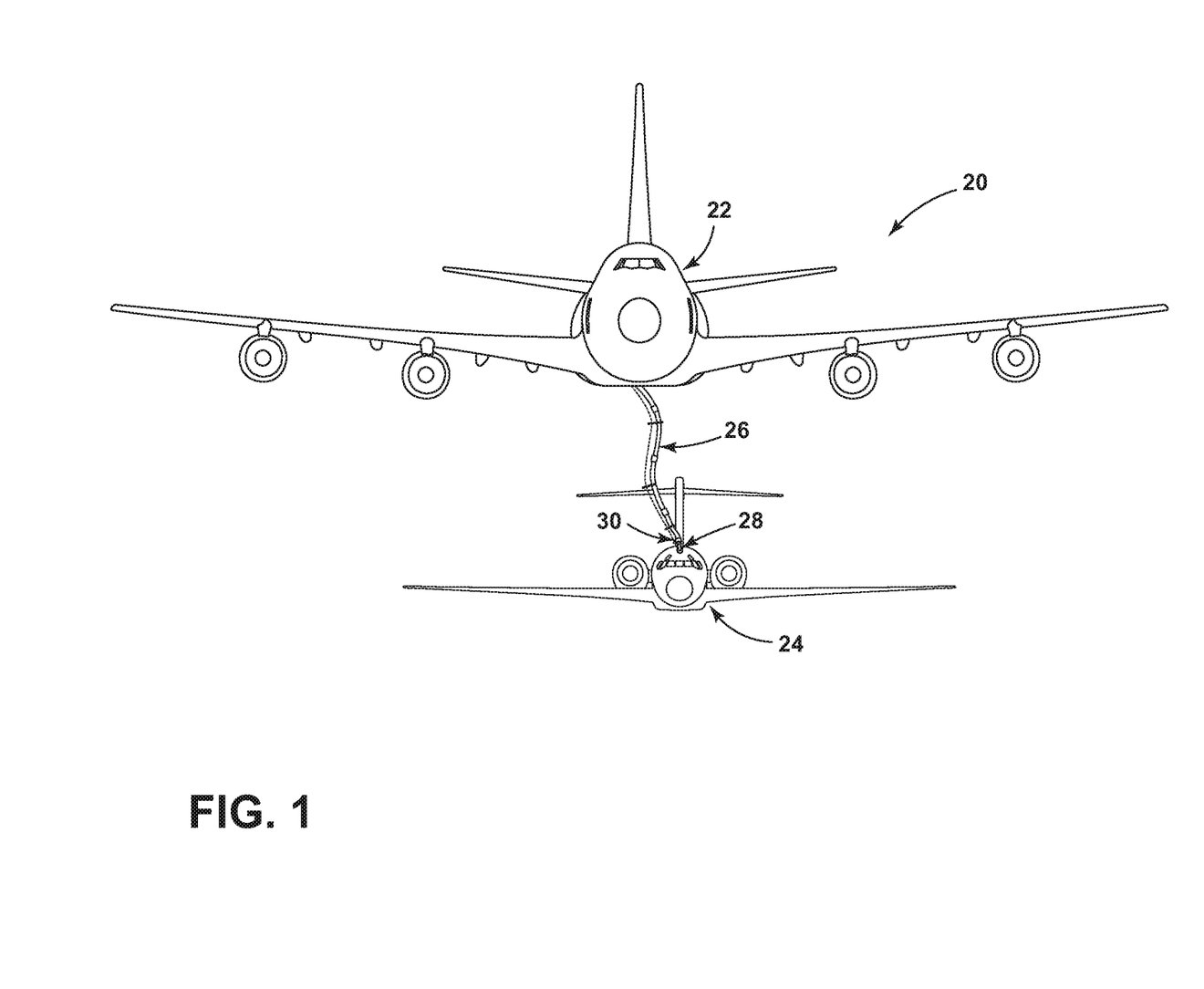
FIG. 1 is a schematic view generally illustrating an embodiment of a fluid system including a tanker aircraft, a receiving aircraft, a nozzle, and a fluid coupling connected between the tanker aircraft and the receiving aircraft according to teachings of the present disclosure.

In embodiments, such as generally illustrated in FIG. 1, a fluid system 20, such as an aerial refueling system, may include a first fluid container 22 (e.g., a tanker aircraft), a second fluid container 24 (e.g., a receiving aircraft), a conduit/hose 26 connected to the first fluid container 22, a nozzle 28 (e.g., fluid nozzle) connected to the second fluid container 24, and/or a fluid coupling 30. The fluid coupling 30 may connect the conduit 26 with the nozzle 28 to selectively provide fluid communication between the first fluid container 22 and the second fluid container 24. For example and without limitation, a fluid coupling 30 may be configured to selectively (e.g., under certain conditions) provide fuel from a tanker aircraft to a receiving aircraft.

With embodiments, such as generally illustrated in FIGS. 2-12, a fluid coupling 30 may include one or more of a variety of shapes, sizes, configurations, and/or materials. A fluid coupling 30 may include an inlet housing member 32, an outlet or latch housing member 34, a regulator assembly 36, a main poppet 38, a pilot poppet 40, a poppet sleeve 42, a poppet cage 44, a poppet housing 46, and/or an orifice 48.

In embodiments, an inlet housing member 32 may be connected with an outlet housing member 34, such as via a ball joint configuration 50 that may be configured for the inlet housing member 32 and the outlet housing member 34 to move relative to each other. For example and without limitation, the inlet housing member 32 may be configured to rotate or tilt within a cone-shaped area 52A, such as a cone including an angle of about 45 degrees (see, e.g., FIG. 4). Additionally or alternatively, the outlet housing member 34 may be configured to rotate or tilt within a cone-shaped area 52B, such as a cone including an angle of about 45 degrees (see, e.g., FIGS. 12 and 13). A ball joint configuration 50 may include a substantially spherical portion 54 of the inlet housing member 32 being connected to and/or disposed at least partially in a substantially spherical portion 56 of the outlet housing member 34 (see, e.g., FIG. 2). A ball housing 58 may be connected to the outlet housing member 34 and/or the inlet housing member 32, and may be configured to facilitate a movable and sealed connection between the inlet housing member 32 and the outlet housing member 34.

With embodiments, an inlet housing member 32 and an outlet housing member 34 may be connected to provide an internal chamber 60. One or more of a regulator assembly 36, a main poppet 38, a pilot poppet 40, a poppet sleeve 42, a poppet cage 44, and/or a poppet housing 46 may be disposed partially or entirely in the internal chamber 60.

With embodiments, an inlet housing member 32 and an outlet housing member 34 may be of similar size (e.g., length). For example and without limitation, a length (e.g., an axial length) of an inlet housing member 32 may be within about 10% of the length of the outlet housing member 34. In embodiments, a maximum diameter of the outlet housing member 34 may be disposed proximate the inlet housing member 32.

In embodiments, a main poppet 38 may be movably connected in the chamber 60. The main poppet 38 may move between an open position in which the main poppet 38 permits fluid flow (see, e.g., FIG. 2) and a closed position in which the main poppet 38 prevents or restricts fluid flow (see, e.g., FIG. 3). A fluid coupling 30 may include one or more main poppet springs 62 that may be configured to bias the main poppet 38 toward the closed position (e.g., away from the inlet housing member 32).

In embodiments, a fluid coupling 30 may include a poppet cage 44 that may be connected to (e.g., fixed to) the outlet housing member 34. The main poppet 38 may selectively sealingly engage a seat 64 of the outlet housing member 34. The seat 64 may be provided by and/or formed with a poppet cage 44. The main poppet 38, the pilot poppet 40, and/or a regulator 72 of the regulator assembly 36 may be configured to move relative to the poppet cage 44.

With embodiments, a fluid coupling 30 may include a pilot poppet 40 that may be connected to the main poppet 38 and may be configured to move relative to the main poppet 38. The pilot poppet 40 may be configured for actuation via a nozzle 28 that may be at least partially inserted into an outlet housing member 34 (see, e.g., FIG. 6). Upon insertion of a nozzle 28, the nozzle 28 may overcome a pilot poppet spring 66 to cause the pilot poppet 40 to move away from the main poppet 38 (e.g., axially toward the inlet housing member 32 and/or the poppet sleeve 42—see FIG. 7). The pilot poppet spring(s) 66 may be connected to the poppet sleeve 42 and/or the pilot poppet 40. The poppet sleeve 42 may be connected to and/or may move with the main poppet 38. Opening of the pilot poppet 40 may permit equalization of fluid pressures (e.g., in the chamber 60), at least to some degree, which may facilitate opening of a main poppet 38 and/or reduce an engagement force (e.g., a physical/mechanical force between the fluid coupling 30 and the nozzle 28 to open the fluid coupling 30).

In embodiments, a regulator assembly 36 may include a regulator housing 70 and/or a regulator 72. A regulator housing 70 may include one or more of a variety of shapes, sizes, configurations, and/or materials. A regulator housing 70 may, without limitation, include a forward regulator housing member 74 and an aft regulator housing member 76, which may, for example, be connected in a substantially spherical configuration. The regulator housing 70 may be connected (e.g., fixed) to the outlet housing member 34. A poppet housing 46 may be connected (e.g., fixed) to the poppet cage 44. The regulator housing 70 may be connected to the outlet housing member 34 via the poppet housing 46 and/or the poppet cage 44. The poppet housing 46 may be disposed substantially within the regulator housing 70 and/ or may extend at least partially into the regulator 72. As the regulator 72 moves between open and closed positions, the regulator 72 may move along a portion of the poppet housing 46. The one or more main poppet springs 62 may be connected between the poppet housing 46 and the poppet sleeve 42.

In embodiments, a regulator 72 may include a first/open position in which the regulator 72 does not substantially restrict fluid flow through the fluid coupling 30 (see, e.g., FIGS. 3-9). Additionally or alternatively, a regulator 72 may include a closed position in which the regulator 72 restricts and/or prevents fluid flow through the fluid coupling 30 (see, e.g., FIG. 11). A regulator 72 may include one or more partially closed positions in which the regulator 72 may restrict flow at least to some degree (see, e.g., FIGS. 2 and 10). The regulator 72 may move between open and closed positions according to a pressure in the fluid coupling 30. For example and without limitation, if a fluid pressure in a fluid coupling 30 is below a threshold, one or more regulator springs 78 may bias the regulator 72 to an open position (e.g., away from the outlet housing member 34). If a fluid pressure meets or exceeds a threshold, the fluid pressure may overcome the regulator spring(s) 78, which may cause the regulator 72 to start to close or to close completely to restrict/prevent fluid flow. The regulator springs 78 may be connected between the regulator 72 and the poppet housing 46.

With embodiments, a main poppet 38, a pilot poppet 40, and/or a regulator 72 of a fluid coupling 30 may close in the same direction, such as toward the outlet housing member 34, and/or may open in the same direction, such as toward the inlet housing member 32.

Figure 2:
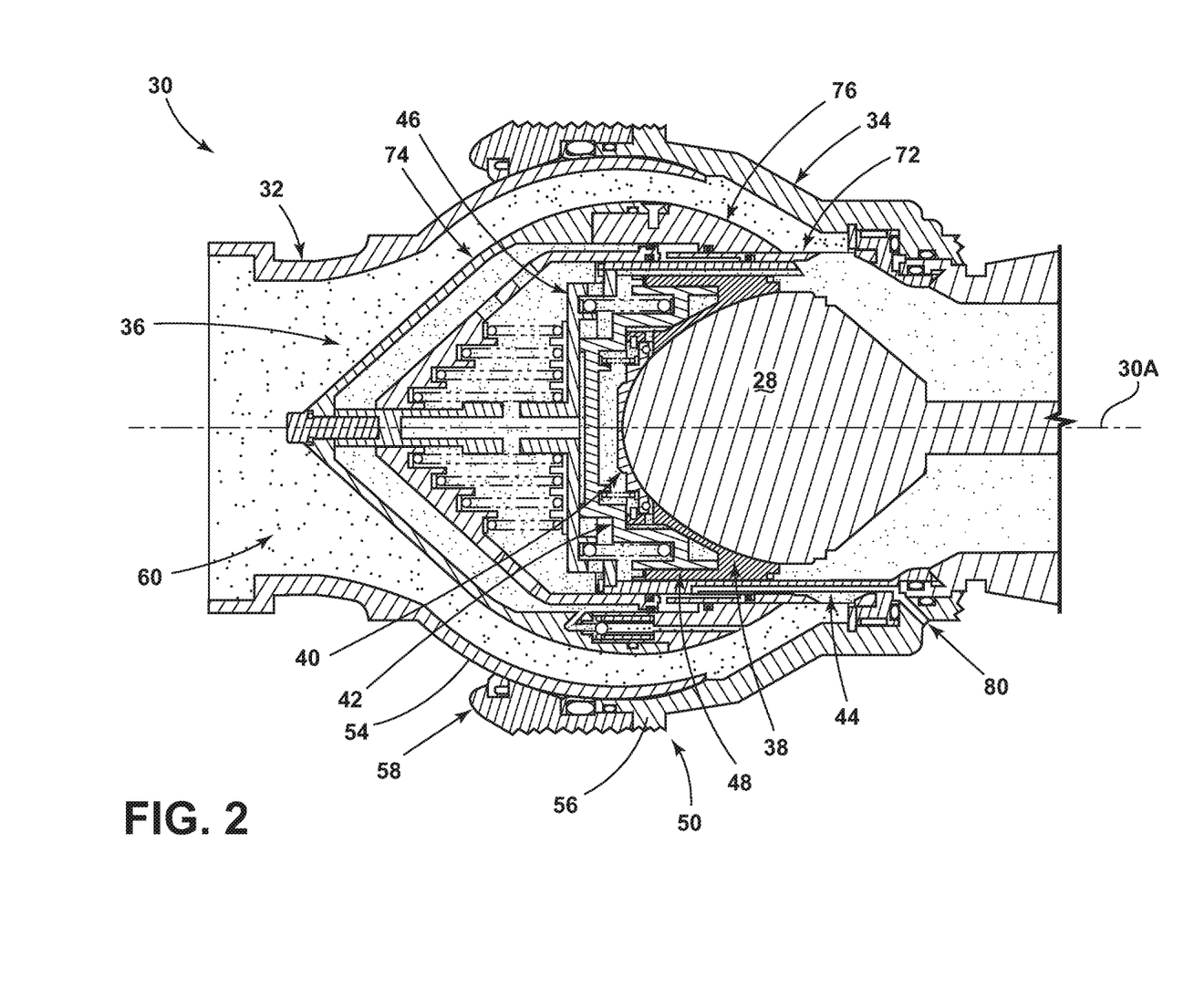
FIG. 2 is a cross-sectional view generally illustrating embodiments of a fluid coupling and a nozzle according to teachings of the present disclosure.
Figure 9:
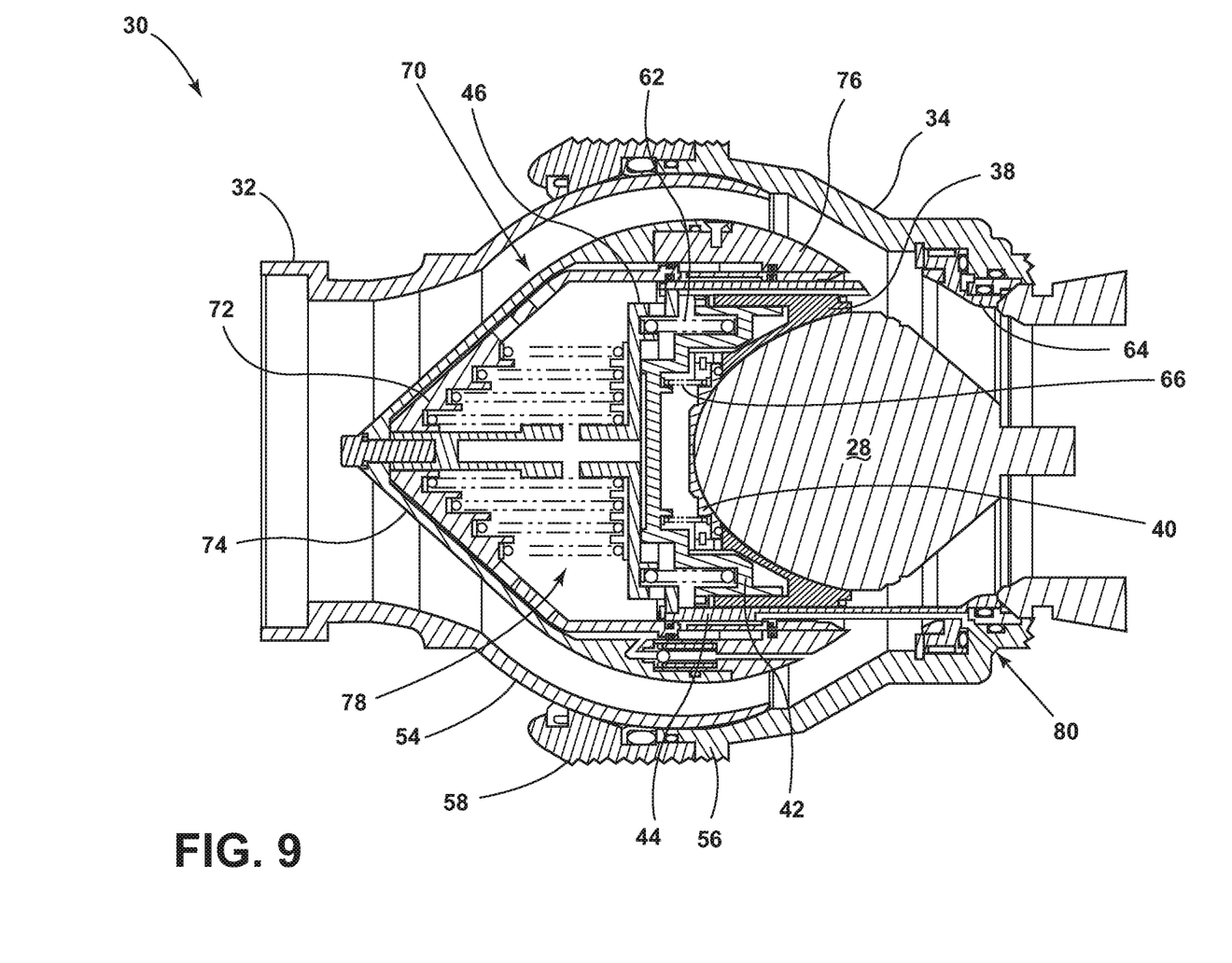
Figure 10:
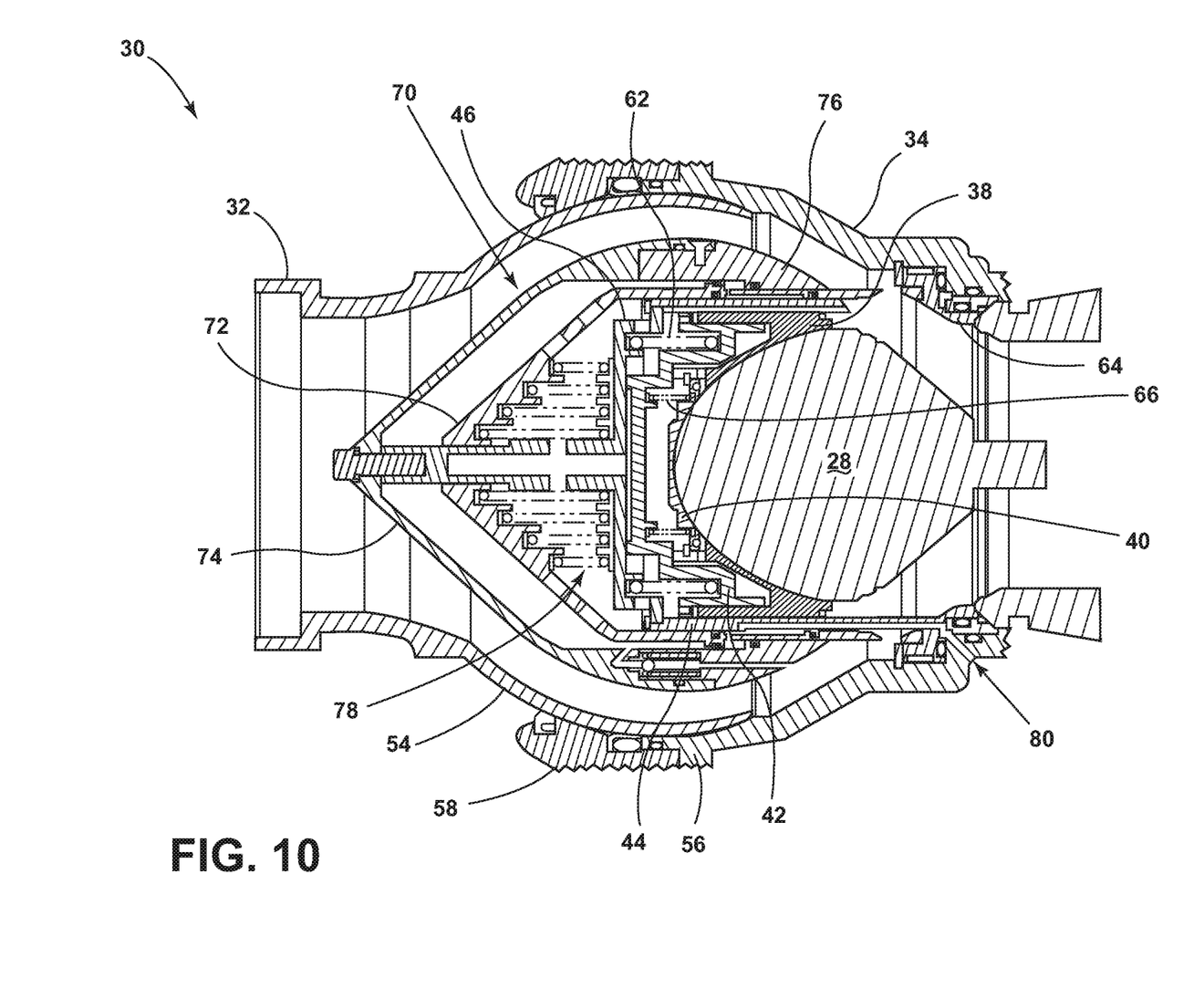
Figure 11:
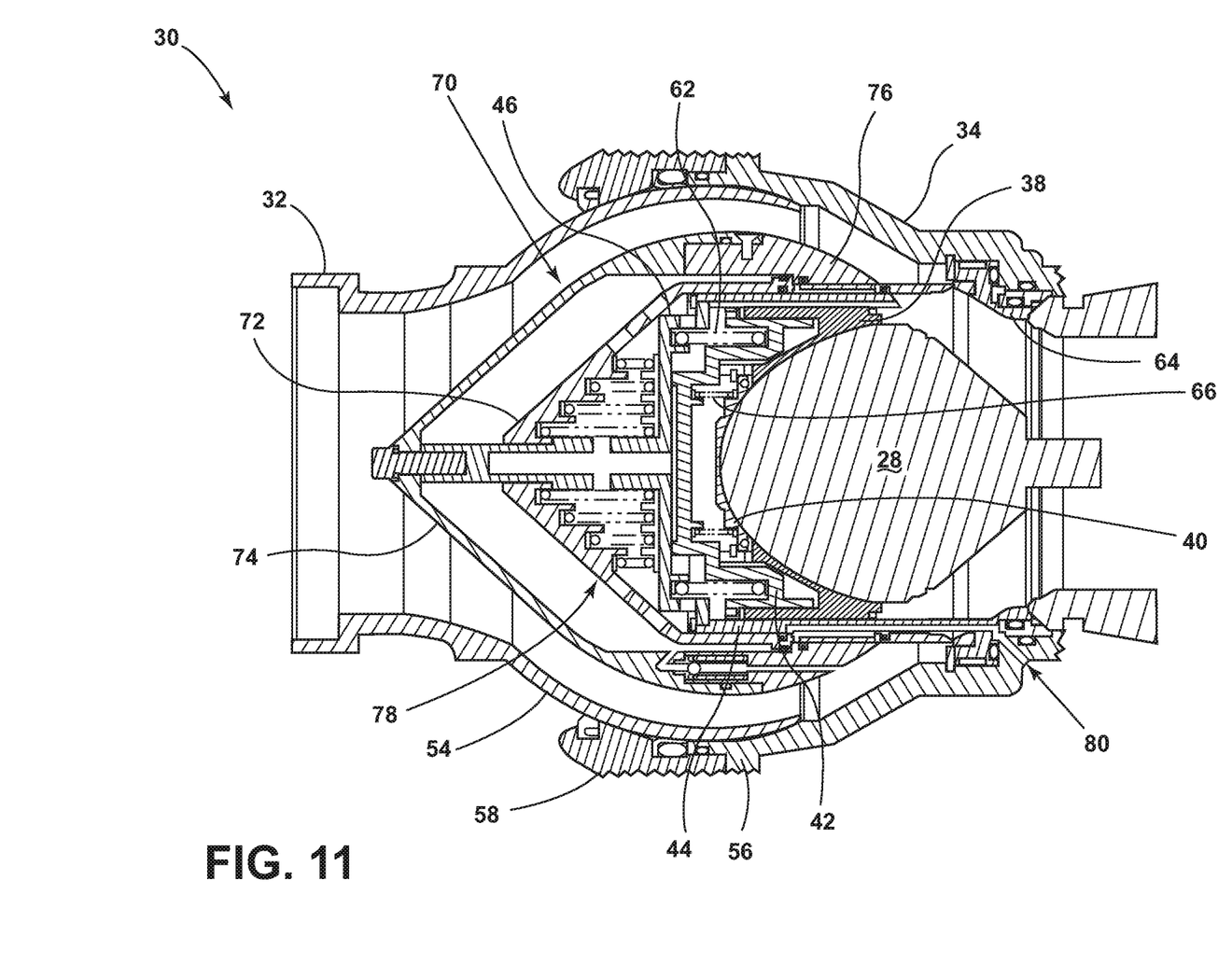

In embodiments, portions of a main poppet 38 and a pilot poppet 40 may be disposed axially (and radially) within a regulator 72 in at least some relative positions of the main poppet 38, the pilot poppet 40, and the regulator 72. For example and without limitation, in a fully open position of a fluid coupling 30, such as generally illustrated in FIGS. 2 and 9, the pilot poppet 40 and the main poppet 38 may be disposed entirely axially and/or radially within the regulator 72.

With embodiments, a fluid coupling 30 may include one or more ambient air ports 80 that may be configured to connect a regulator assembly 36 and/or the chamber 60 with ambient air pressure (e.g., outside of the fluid coupling 30). One or more ambient air ports 80 may be disposed at least partially in the outlet housing member 34 (e.g., in an outer wall of the outlet housing member 34) and/or may be disposed at least partially in a poppet cage 44 that may be connected to the outlet housing member 34.

Figure 12:
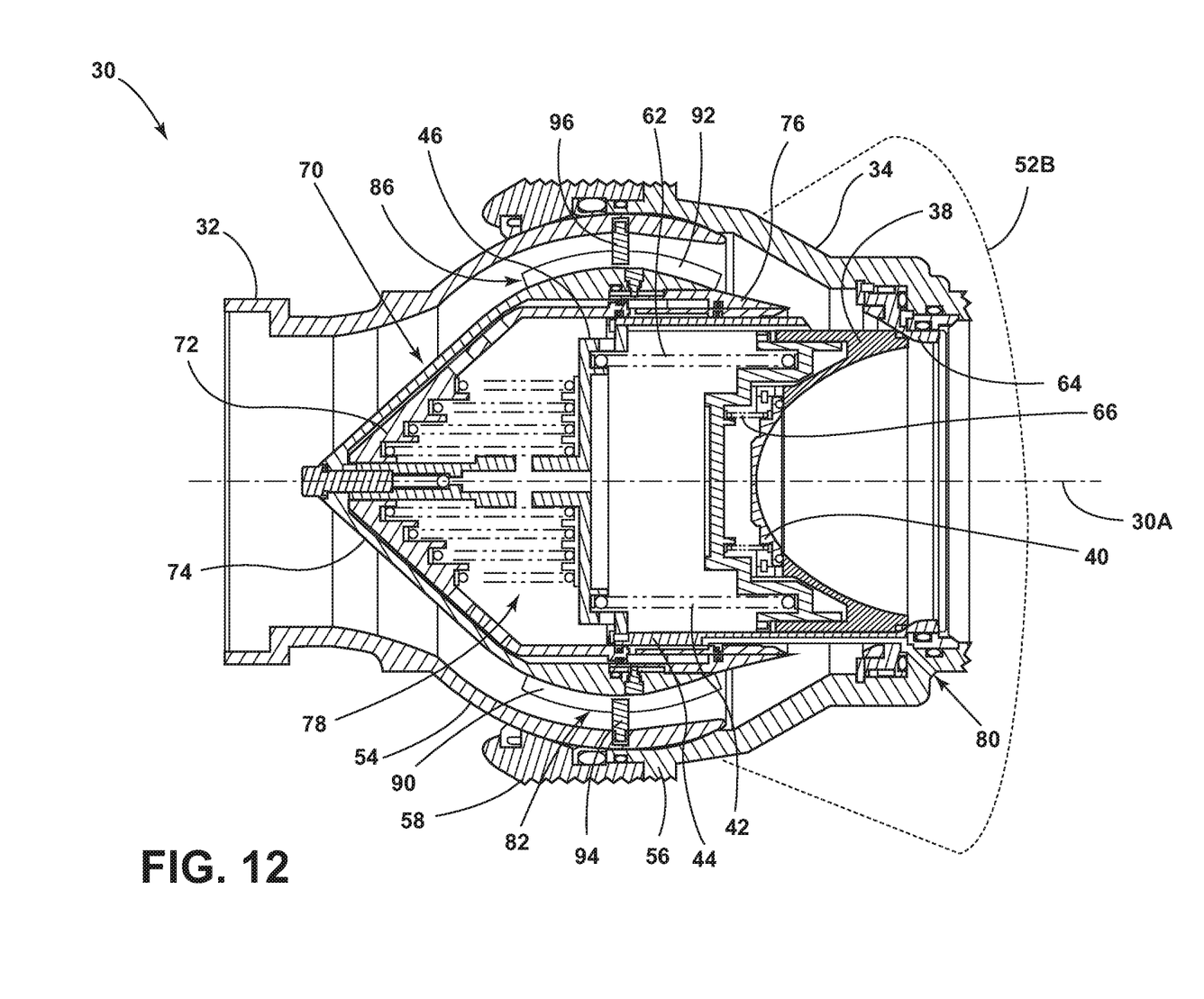
FIGS. 12 and 13 are cross-sectional views generally illustrating embodiments of fluid couplings with axial rotation prevention features according to teachings of the present disclosure.
Figure 13:
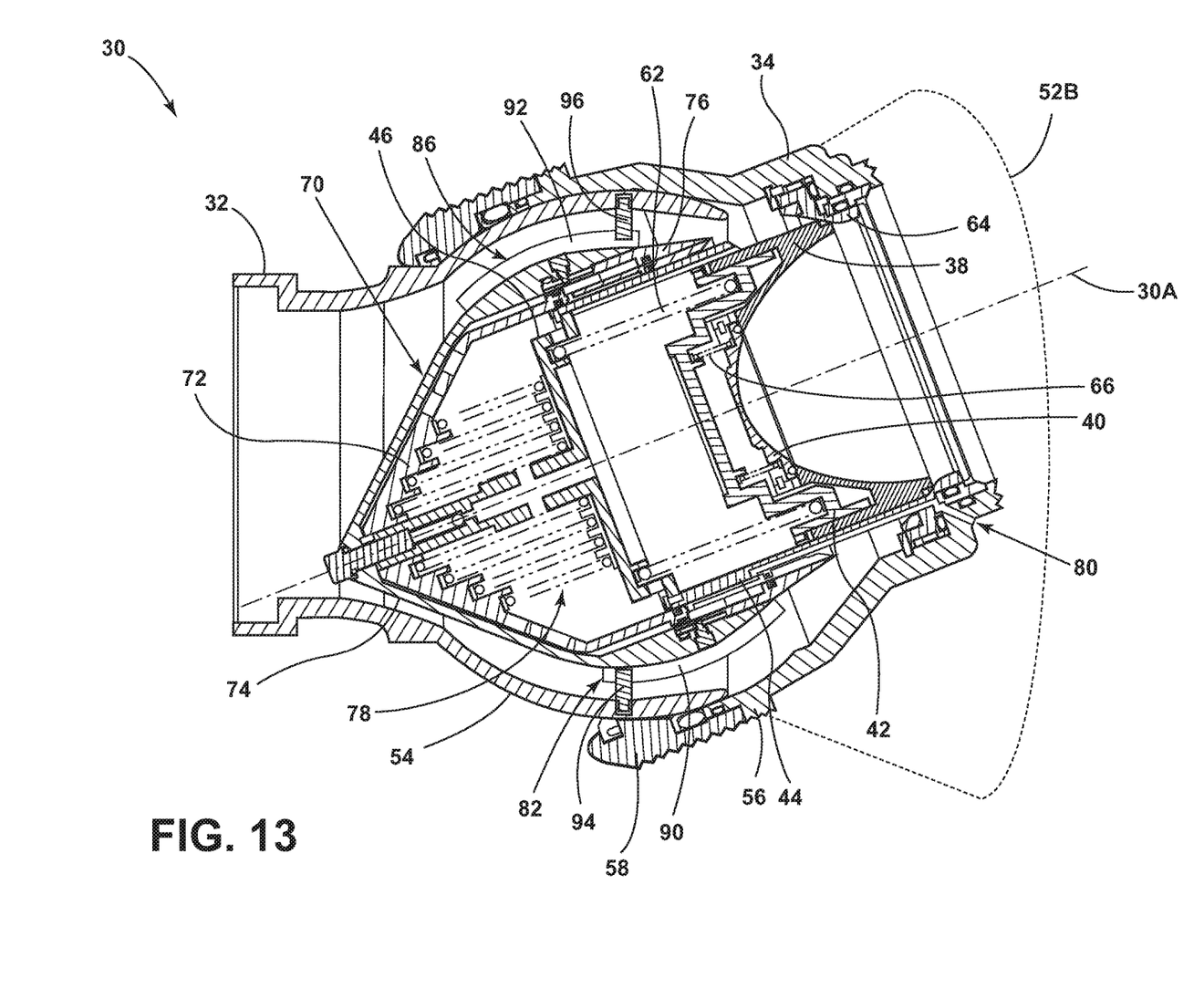

With embodiments, such as generally illustrated in FIGS. 12 and 13, a fluid coupling 30 may include one or features that may be configured to limit or restrict relative movement between the inlet housing member 32 and the outlet housing member 34. For example and without limitation, a fluid coupling 30 may include one or more axial rotation prevention features 82 that may be configured to restrict the inlet housing member 32 and/or the outlet housing member 34 from rotating relative to each other about a longitudinal axis 30A of the fluid coupling 30. An axial rotation prevention feature 82 may include one or more of a variety of shapes, sizes, configurations, and/or materials. For example and without limitation, an axial rotation prevention feature 82 may include a channel 90 and a pin 94 that may be configured to slide at least partially within the channel 90. The channel 90 may be connected to and/or formed with the outlet housing member 34 and/or the forward regulator housing member 74, and a pin 94 may be connected to and/or formed with the inlet housing member 32. Additionally or alternatively, a channel 90, 92 may be connected to and/or formed with the inlet housing member 32 and a pin 94, 96 may be connected to and/or formed with the outlet housing member 34 and/or the forward regulator housing member 74). The channels 90, 92 may extend substantially in an axial direction and/or a circumferential direction.

With embodiments, an axial rotation prevention feature 82 of a fluid coupling may include a first channel 90, a second channel 92, a first pin 94, and/or a second pin 96. The first channel 90 and the first pin 94 may be disposed opposite (e.g., about 180 degrees from) the second channel 92 and the second pin 96. The first channel 90 and the second channel 92 may be connected to and/or formed with the same component (e.g., the forward regulator housing member 74) or may be connected to and/or formed with different components (e.g., one with the forward regulator housing member 74 and one with the inlet housing member 32). The first pin 94 and the second pin 96 may be connected to and/or formed with the same component (e.g., the inlet housing member 32) or may be connected to and/or formed with different components (e.g., one with the regulator housing 70 and one with the inlet housing member 32).

In embodiments, an axial rotation prevention feature 82 may be configured to facilitate and/or permit relative movement between the inlet housing member 32 and the outlet housing member 34 in a plurality of directions (e.g., sliding movement through channel(s) 90, 92, rotating about an axis defined by the pins 94, 96, etc.) while restricting relative axial rotational movement. In some circumstances, an inlet housing member 32 may remain relatively fixed and an outlet housing member 34 may be configured to move relative to the inlet housing member 32. For example and without limitation, the outlet housing member 34 may rotate or tilt about an area 52B (e.g., about a 45-degree area, such as generally illustrated in FIGS. 12 and 13) and the axial rotation prevention feature 82 may substantially prevent the outlet housing member 34 from rotating about the longitudinal axis 30A. Restricting axial rotation may be desirable to limit or prevent damage to external components that may be connected to or near a fluid coupling 30, such as, for example and without limitation, wires or cables that may otherwise become twisted.

Figure 3:
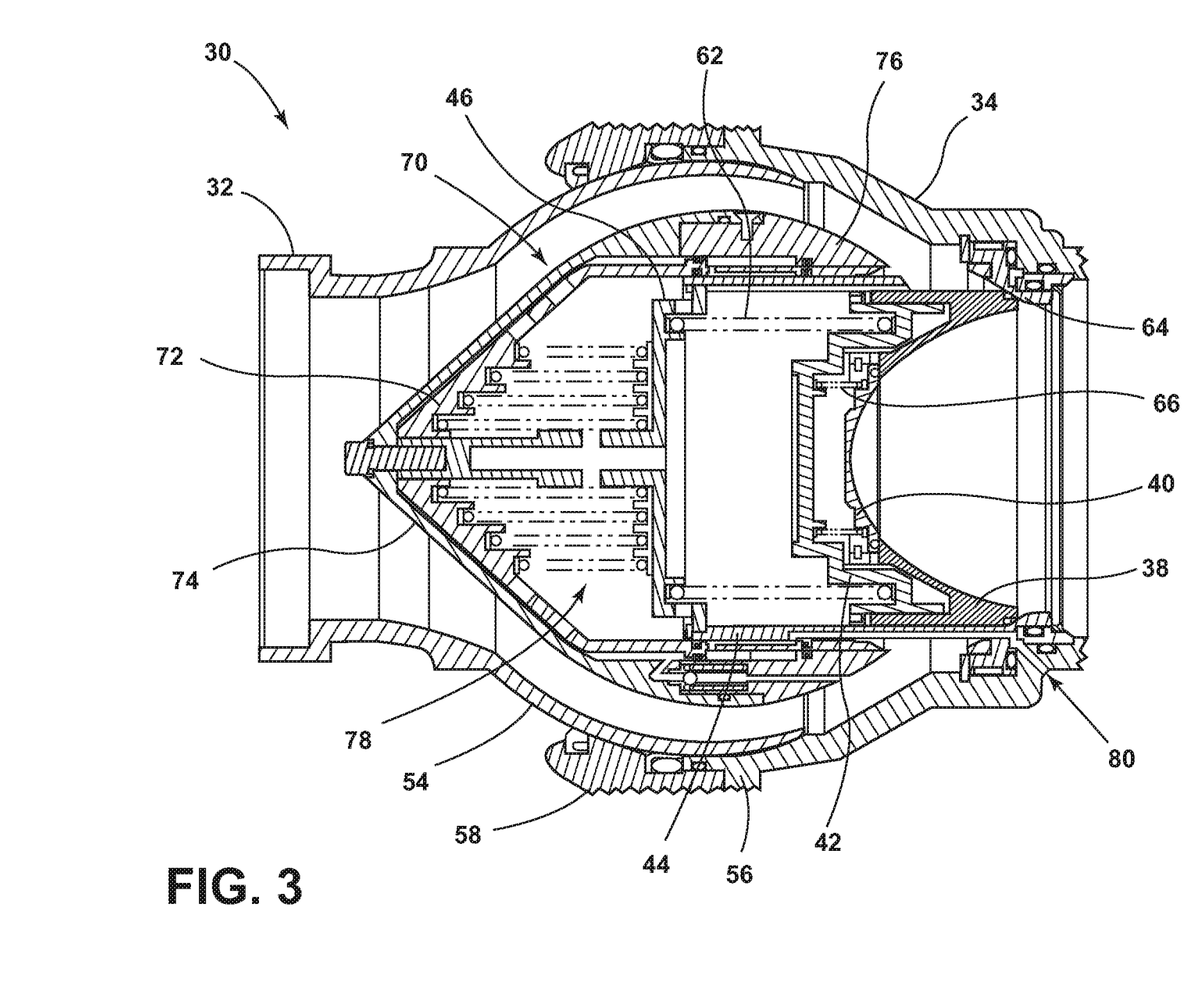
FIGS. 3 and 4 are cross-sectional views generally illustrating embodiments of fluid couplings according to teachings of the present disclosure.
Figure 4:
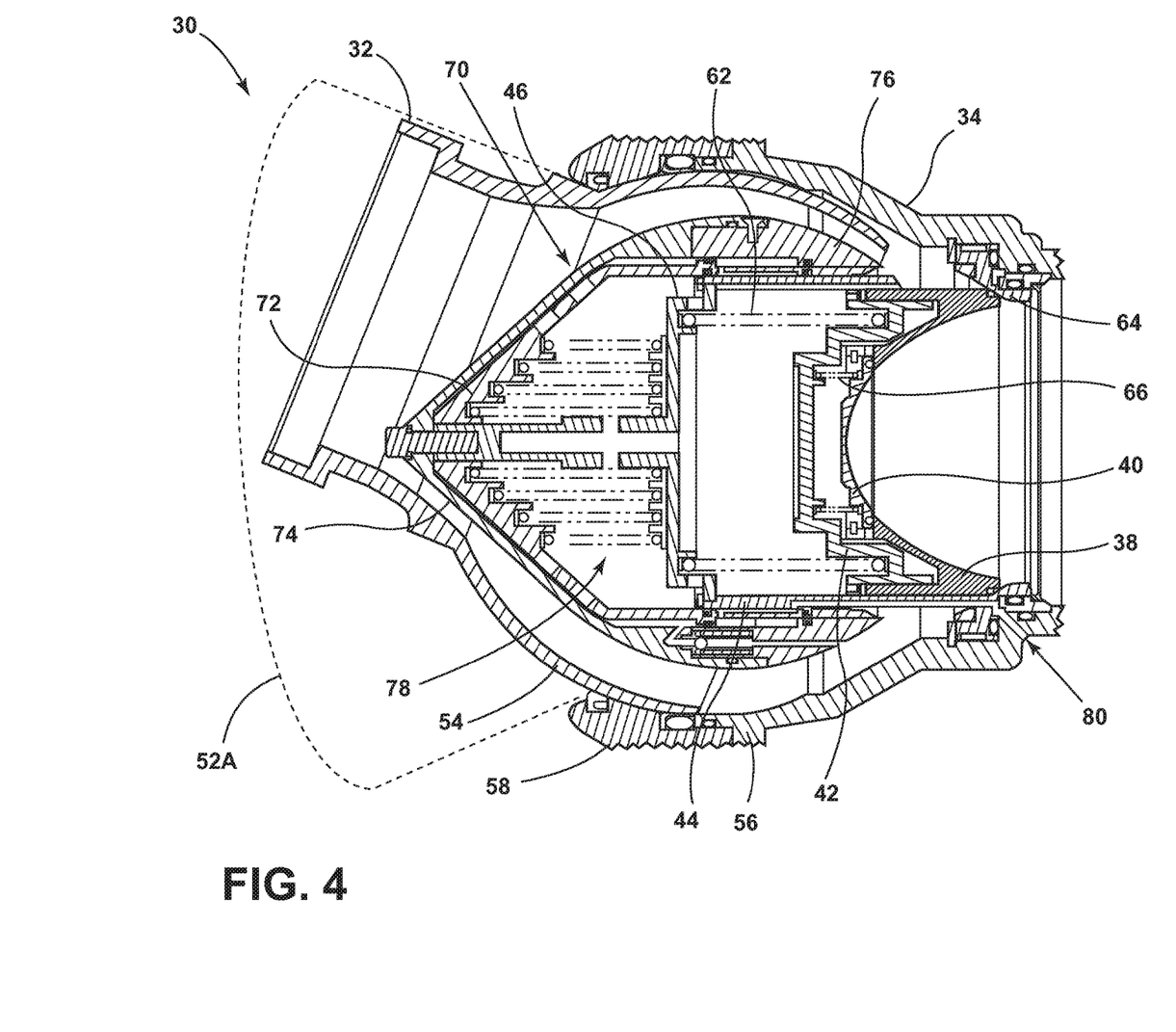
Figure 5:
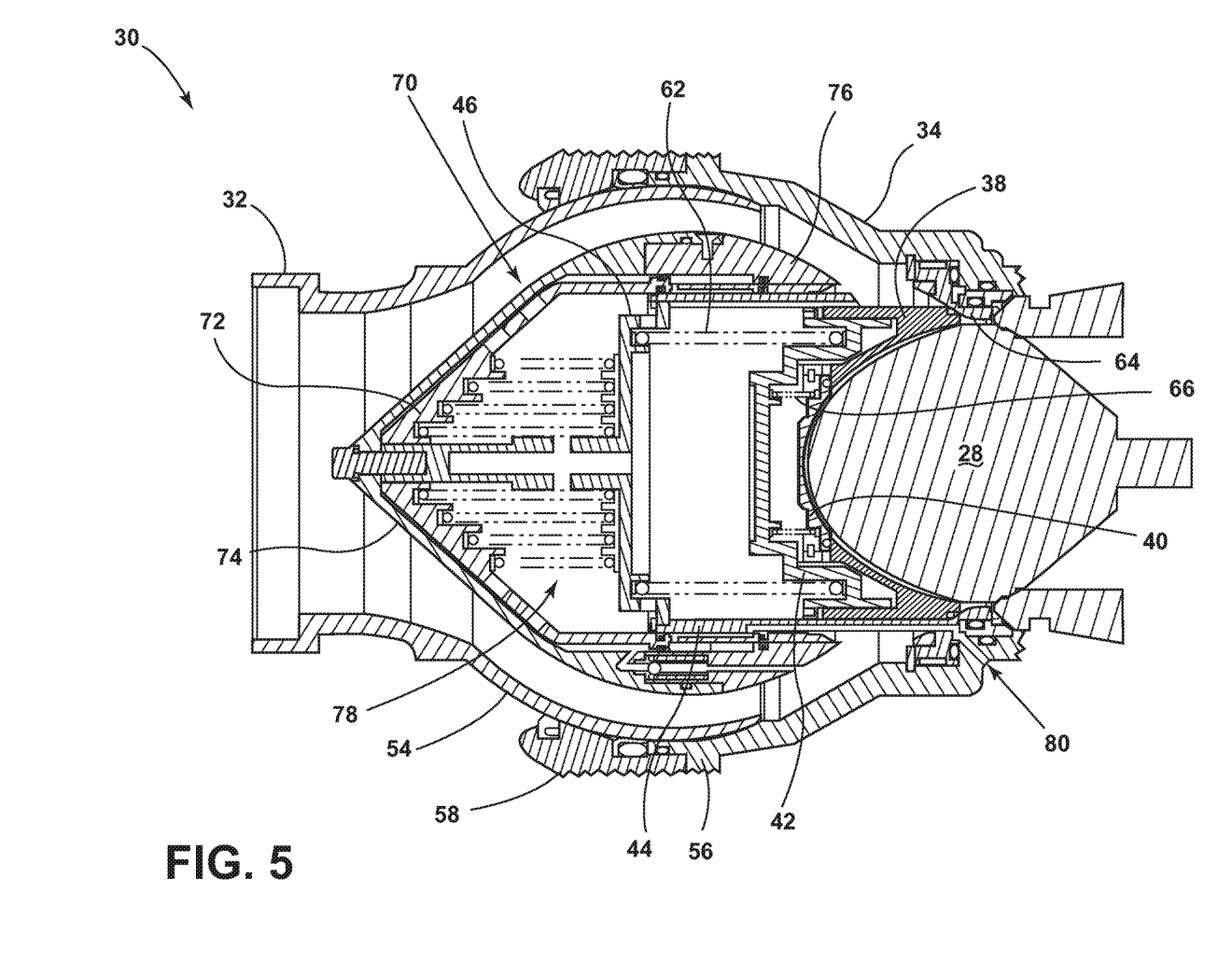
FIGS. 5-11 are cross-sectional views generally illustrating embodiments of fluid couplings and nozzles according to teachings of the present disclosure.
Figure 6:
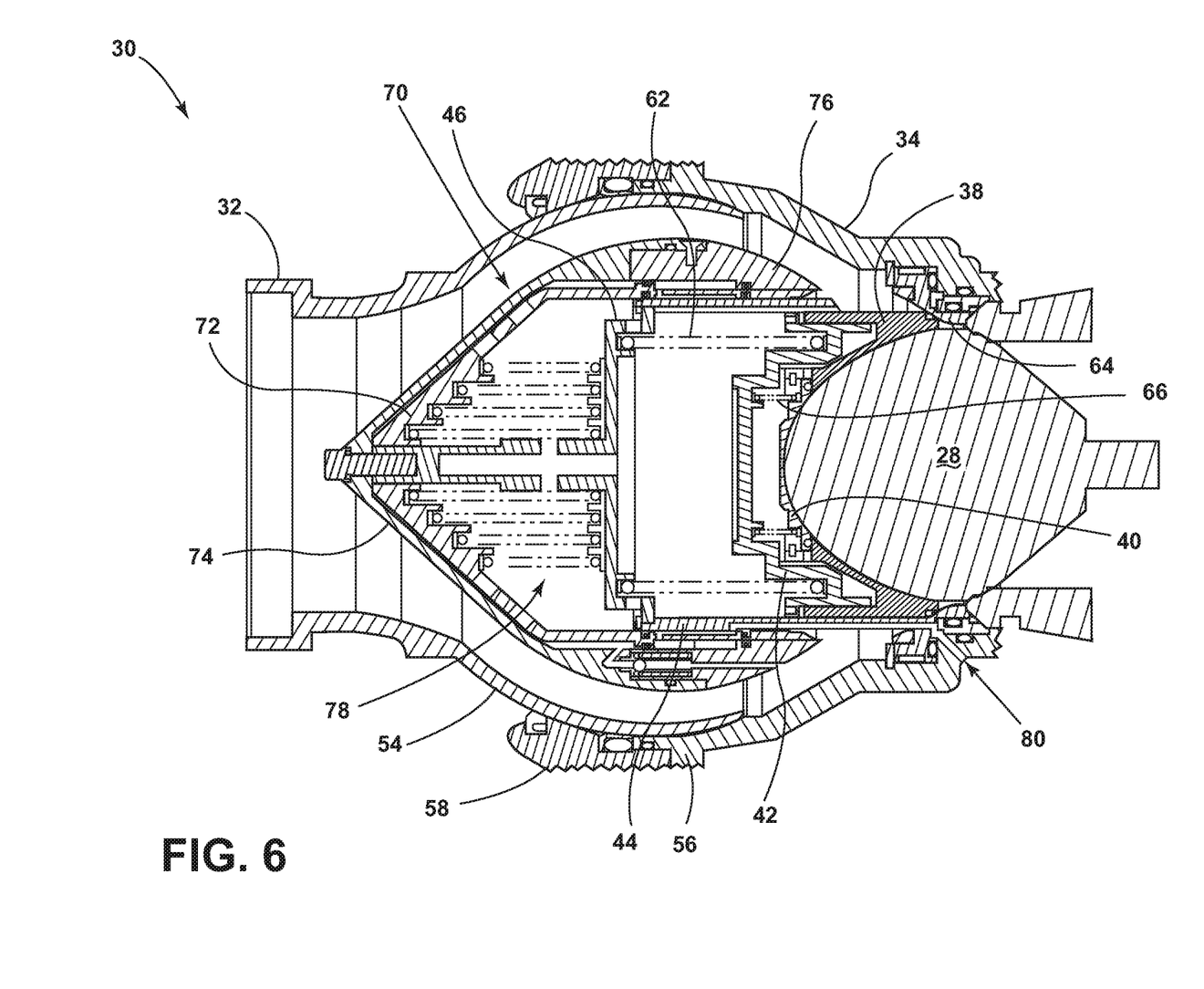
Figure 7:
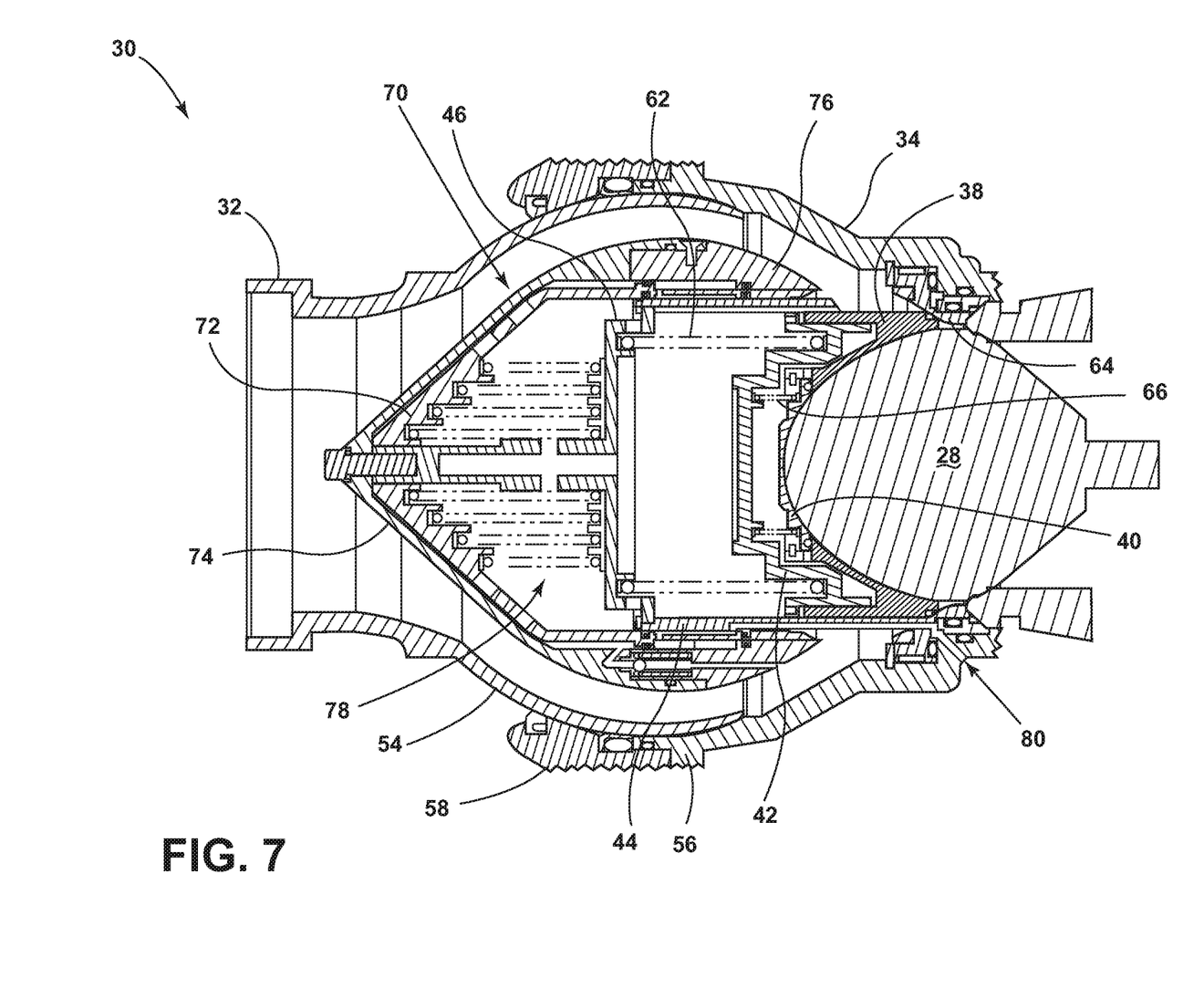
Figure 8:
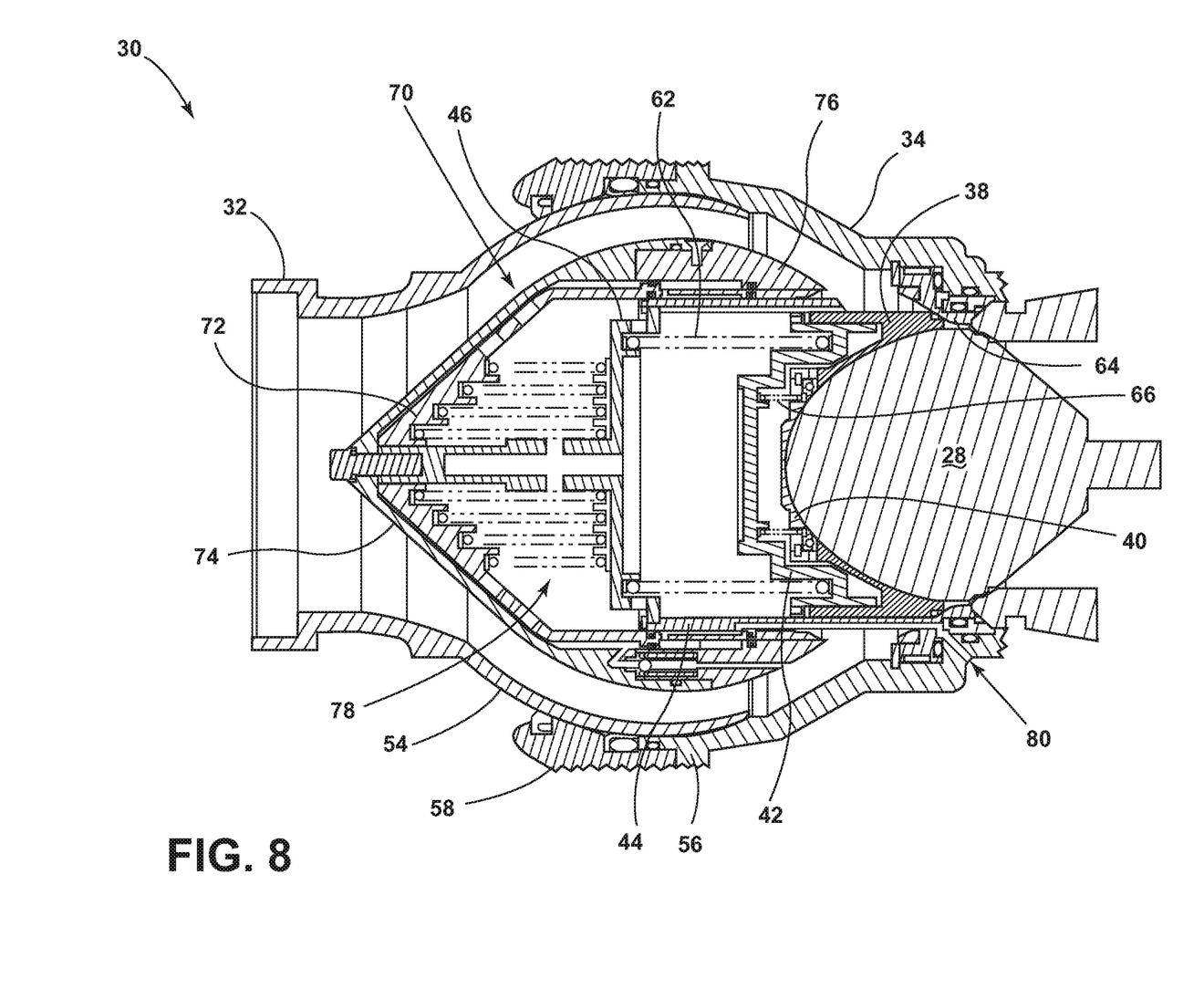

In embodiments, such as generally illustrated in FIG. 1, a fluid coupling 30 may be connected to a first fluid container 22 (e.g., a tanker aircraft) and/or to a second fluid container 24 (e.g., a receiving aircraft). Pressurized fluid from the tanker aircraft 22 may be provided to the fluid coupling 30 for transmission to the receiving aircraft 24, such as for refueling. In an initial configuration of a fluid coupling 30, such as generally illustrated in FIG. 3, a main poppet 38 may be closed (e.g., in a sealing engagement with the outlet housing member 34), a pilot poppet 40 may be closed (e.g., in a sealing engagement with the main poppet 38), and/or a regulator 72 may be open. The closed main poppet 38 and closed pilot poppet 40 may, at least initially, restrict or prevent fluid flow through the fluid coupling 30 (from the inlet housing member 32 to the outlet housing member 34. If a nozzle 28, such as a nozzle of a receiving aircraft 24, is connected to the outlet housing member 34, the nozzle 28 may cause the pilot poppet 40 to open at least to some degree (see, e.g., FIGS. 7 and 8). Opening of the pilot poppet 40 may allow the fluid pressure in the fluid coupling 30 to match or approach a fluid pressure of the receiving aircraft 24. If the nozzle 28 continues to be inserted, the nozzle 28 may cause the main poppet 38 to open (e.g., fully) to allow full fluid flow (see, e.g., FIG. 9). If, during operation, the fluid pressure in the fluid coupling 30 exceeds a threshold (e.g., a maximum pressure), the regulator may close to limit the fluid pressure in the fluid coupling and/or the fluid pressure at the receiving aircraft 24.

With embodiments, a fluid coupling 30 may be configured as a low engagement force coupling, such as MA-3 type coupling, that may be configured to engage a nozzle 28, such as a MA-2 type nozzle.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A fluid coupling, comprising:
   an inlet housing member;
   an outlet housing member rotatably connected with the inlet housing member to define a chamber, the outlet housing member configured to connect or mate with and at least partially receive a fluid nozzle;
   a regulator assembly disposed in the chamber and connected to the outlet housing member, the regulator assembly including a regulator housing and a regulator;
   a main poppet configured to control fluid flow between the inlet housing member and the outlet housing member; and
   a pilot poppet configured to selectively permit fluid flow through the main poppet;
   wherein the regulator, the main poppet, and the pilot poppet close in the same direction.

2. The fluid coupling of claim 1, including:
   a channel connected to or formed with one of the regulator housing and the inlet housing member; and
   a pin connected to the other of the inlet housing member and the regulator housing;
   wherein the pin is disposed at least partially in the channel to restrict rotation of the inlet housing member relative to the outlet housing member about a longitudinal axis of the fluid coupling.

3. The fluid coupling of claim 1, wherein, in an open position of the main poppet, the main poppet and the pilot poppet are disposed in the regulator.

4. The fluid coupling of claim 1, including one or more ambient air ports.

5. The fluid coupling of claim 4, wherein at least one of the one or more ambient air ports is disposed at least partially in the outlet housing member and in a poppet cage.

6. The fluid coupling of claim 1, including a poppet cage disposed in the chamber.

7. The fluid coupling of claim 6, wherein the poppet cage includes a seat and the main poppet is configured to selectively sealingly engage the seat.

8. The fluid coupling of claim 6, wherein the pilot poppet, the main poppet, and the regulator are configured to move relative to the poppet cage.

9. The fluid coupling of claim 6, wherein the poppet cage is fixed to the outlet housing member.

10. The fluid coupling of claim 1, wherein the regulator assembly includes one or more regulator springs configured to bias the regulator away from the outlet housing member.

11. The fluid coupling of claim 1, wherein the regulator housing includes a forward regulator housing member and an aft regulator housing member connected in a substantially spherical configuration.

12. The fluid coupling of claim 1, wherein a length of the inlet housing member is within 10% of the length of the outlet housing member.

13. The fluid coupling of claim 1, wherein a maximum diameter of the outlet housing member is disposed proximate the inlet housing member.

14. The fluid coupling of claim 1, including a main poppet spring configured to bias the main poppet closed, a pilot poppet spring configured to bias the pilot poppet closed, and a regulator spring configured to bias the regulator open.

15. The fluid coupling of claim 1, including a poppet cage connected to the outlet housing member; a poppet sleeve connected to the poppet cage; and a poppet housing connected to the poppet cage.

16. The fluid coupling of claim 15, wherein the regulator is configured to move along the poppet housing.

17. The fluid coupling of claim 15, including:
    a main poppet spring configured to bias the main poppet closed;
    a pilot poppet spring configured to bias the pilot poppet closed; and
    a regulator spring configured to bias the regulator open;
    wherein the main poppet spring is connected between the poppet housing and the poppet sleeve; the pilot poppet spring is connected between the poppet sleeve and the pilot poppet; and the regulator spring is connected between the regulator and the poppet housing.

18. A fluid coupling, comprising:
    an inlet housing member;
    an outlet housing member rotatably connected with the inlet housing member to define a chamber, the outlet housing member configured to connect or mate with and at least partially receive a fluid nozzle;
    a regulator assembly disposed in the chamber and connected to the outlet housing member, the regulator assembly including a regulator housing and a regulator;
    a main poppet configured to control fluid flow between the inlet housing member and the outlet housing member; and
    a pilot poppet configured to selectively permit fluid flow through the main poppet;
    wherein, in an open position of the main poppet, the main poppet and the pilot poppet are disposed in the regulator.

19. A fluid coupling, comprising:
    an inlet housing member;
    an outlet housing member rotatably connected with the inlet housing member to define a chamber, the outlet housing member configured to connect or mate with and at least partially receive a fluid nozzle;
    a regulator assembly disposed in the chamber and connected to the outlet housing member, the regulator assembly including a regulator housing and a regulator;
    a main poppet configured to control fluid flow between the inlet housing member and the outlet housing member;
    a pilot poppet configured to selectively permit fluid flow through the main poppet; and
    a poppet cage disposed in the chamber and fixed to the outlet housing member.

* * * * *